UNITED STATES PATENT OFFICE.

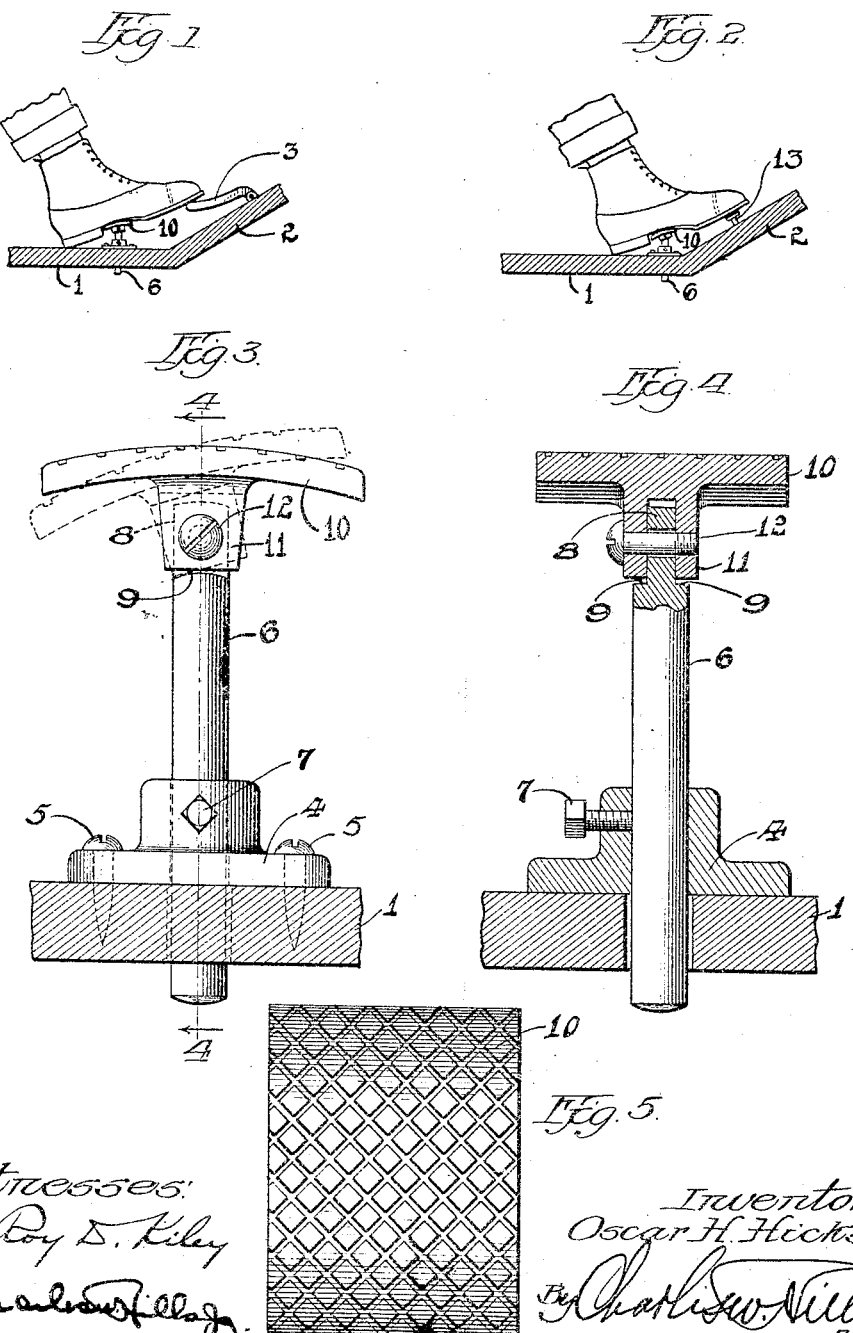

OSCAR H. HICKS, OF CHICAGO, ILLINOIS.

AUTOMOBILE-ACCELERATOR FOOT-REST.

1,186,095.  Specification of Letters Patent.  Patented June 6, 1916.

Application filed December 11, 1915. Serial No. 66,263.

*To all whom it may concern:*

Be it known that I, OSCAR H. HICKS, a citizen of the United States, and a resident of the city of Chicago, in the county of Cook and State of Illinois, have invented certain new and useful Improvements in Automobile-Accelerator Foot-Rests; and I do hereby declare that the following is a full, clear, and exact description of the same, reference being had to the accompanying drawings, and to the numerals of reference marked thereon, which form a part of this specification.

In practically every type of motor car, with the exception of electric vehicles and steam driven cars, the operation of the car is controlled almost entirely by means of the accelerator pedal. The principal function of the accelerator pedal is to operate the throttle valve controlling the flow of fuel mixture into the engine, although auxiliary connections functioning to vary the timing of the spark or other purposes may be connected thereto. Of course, a hand throttle lever is generally provided on the steering wheel for the same purpose, but in very few instances is this lever used in operating the car through its various range of speeds and under the many different conditions encountered. The use of the hand throttle lever in controlling the car is exceedingly inconvenient, allowing the operator the use of only one hand for the steering wheel and proving a hindrance to easy shifting of the transmission gears, for the reason that either the steering wheel itself must be released or the throttle lever. If the gears are shifted without adjustment of the throttle lever (when the accelerator pedal is not used), the engine races as the load is thrown off, or the clutch released, and this increase in the speed or racing of the engine is wasteful of fuel, detrimental to the engine itself, and as well makes shifting of the transmission gears without clashing, very difficult. By using the accelerator pedal, however, both hands of the operator are entirely free for use on the steering wheel and gear shift lever, and the accelerator pedal may then be conveniently operated by the foot to meet the various conditions of driving. In order to shift gears, pressure on the pedal is released, whereby the speed of the engine decreases and the car coasts along, with the clutch thrown out as the gears are shifted, and power can be gradually applied again by pressing downwardly on the accelerator pedal and allowing the clutch to gradually engage once more. In the event of a sudden stop becoming necessary, the operator thrusts the clutch pedal down with one foot, at the same time shifting the other foot from the accelerator pedal to the brake pedal, thereby applying the brakes on the car, and by the release of the accelerator pedal, of course permitting the engine to slow down to idling speed. Thus the importance of the accelerator pedal as a means of controlling the car, is obvious. However, in the past, the great objection to the use of the accelerator pedal has been the delicacy of touch or pressure adjustment required to vary the speed of the engine or the car, as the case may be, thus necessitating more or less muscular strain upon the leg of the operator in applying the foot to the pedal with the proper degree of pressure. Upon rough roads, proper manipulation of the accelerator pedal has proved almost impossible, for the reason that the car striking a bump or depression, causes the foot to be thrust downwardly, thus pressing the accelerator pedal considerably beyond normal driving position, resulting in a sudden and undesirable application of power. The succession of jarring movements of the foot in its unstable position on the accelerator, constantly changes the speed and power of the engine with a resultant variation in application of power to the car, producing a jerky movement exceedingly uncomfortable to the occupants of the car, and as well unduly stressing the engine and entire car itself.

A number of foot rests have been devised by which the foot of the operator may be supported in position for actuation of the accelerator pedal, but these have not proved a success, due to inherent defects based on the principles of leverage, and although relieving to a large extent the muscular strain on the leg and foot of the operator, are still objectionable as not entirely solving the problem.

These foot rests have taken the form of toe or heel plates attachable to the floor boards of a car, so that the weight or thrust of the foot of the operator is sustained by the foot rest, either at the toe or heel, and all or part of the toe of the foot is utilized in operating the accelerator pedal. Where only a toe plate rest is used, difficulty is experienced in proper manipulation of the accelerator pedal, owing to the fact that the thrust or pressure of the operator's foot for the purpose is largely resisted by the toe plate foot rest, sometimes necessitating a shift of the foot entirely from the rest to the pedal in order to secure the proper depression thereof against its resisting spring.

The objection to heel plate rests is the fact that practically the entire leverage of the foot is used in thrusting down the accelerator pedal with the heel as a fulcrum point and with the force exerted along the axis of the leg of the operator, so that considerable muscular exertion is required to withhold the toe of the shoe lightly upon the accelerator pedal. In both the heel and toe plate supports or rests for the foot, the effect of rough roads is only partly relieved, and the operator still experiences difficulty in proper manipulation of the accelerator pedal. Another objection to the toe and heel plate foot rests is that the same are adapted for use of only one person, or persons having substantially the same size foot or leg reach.

This invention, however, relates to an improved type of foot rest correctly designed to fulcrum the foot as a lever in a position substantially in line with the line of thrust along the leg of the operator, so that the weight of the leg and foot may be sustained entirely by the foot rest and the foot rest may be used as a brace for the operator in maintaining his seat, yet permitting an easy pivotal movement of the foot upon the rest for actuation of the accelerator pedal. This feature is obtained by providing a foot rest mounted on the floor of the motor car having a pivotally mounted curved pedal plate adapted to fit beneath and into the arch of the foot to support the foot and permit the pivotal movement thereof required to depress the accelerator pedal by the toe.

It is an object therefore of this invention to construct a foot rest adapted to fit into and beneath the arch or instep of a foot to support the same and resist thrust through the leg of the operator, and yet permitting an easy pivotal movement of the foot to operate the accelerator pedal beneath the toe thereof.

It is also an object of this invention to provide a pivotal foot rest adjustable as to height, adapted to receive the arch of the foot bearing thereon to afford a brace and support the foot as well, and permit adjusting movements thereof for operation of the accelerator pedal by any part of the forward portion of the foot.

It is furthermore an important object of this invention to provide an adjustable pivotal foot rest readily adaptable for use by different size feet and by persons having a different leg reach, to support the weight of the foot and the thrust received through the leg at a pivotal point of support for the foot, to permit easy operation of the accelerator pedal by the forward portion of the foot, and acting further, due to engagement in front of the heel of the shoe, to act as a brace for the leg and foot, preventing the foot slipping from the accelerator pedal.

It is finally an object of this invention to construct an improved type of support or rest for a foot to sustain the weight and thrust applied thereto substantially along the line of thrust and substantially through the center of gravity of the foot, and in a manner permitting an easy muscular action of the foot for adjustment of a pedal by the forward end of the foot.

The invention (in a preferred form) is illustrated in the drawings and hereinafter more fully described.

In the drawings: Figure 1 is a fragmentary view illustrating the device in use connected on the floor of a motor car. Fig. 2 is a similar view thereof, illustrating the device in use with a different type of accelerator pedal from that shown in Fig. 1. Fig. 3 is an enlarged side elevation of the device with the floor shown in section. Fig. 4 is a sectional view taken on line 4—4 of Fig. 3, with parts in elevation. Fig. 5 is a top plan view of the pivoted pedal plate.

As shown in the drawings: The reference numeral 1, indicates the horizontal portion and 2, the inclined forward portion of the floor or floor board of a motor car, which may be detachable or not, as the case may be, and provided as usual with any type of accelerator pedal 3, as shown, however, pivotally mounted. The connections to the accelerator pedal 3, by which the throttle valve for the carbureter or other auxiliary mechanisms may be operated as mentioned, have been omitted and are well known in the art, and hence no illustration or description thereof is believed to be necessary. Secured upon the upper surface of the level or horizontal portion 1, of the floor or floor board, is a circular base member or collar 4, which may be secured to the floor in any suitable manner, but, as shown, attached by means of screws 5, any number of which, of course, may be used for the purpose. Said base member 4, is preferably constructed of metal, and suitably apertured to receive the screws 5, inserted therethrough to engage into the floor. Of course, when the floor is of metal the same may be drilled and threaded to receive attaching bolts engaged therewith, or drilled entirely through to receive the base bolted to the floor from the under side thereof.

In some instances, it may be desirable to make the base 4, integral with the floor, particularly if the floor is of metal, such as aluminum, where aluminum floor boards are used. Said base is provided with a central axial aperture therethrough, and in the construction shown, the portion 1, of the floor is drilled through in register therewith to permit insertion therethrough of a cylindrical rod or upright 6, of the device, and the same is held fixed in any desired adjusted position, that is, raised or lowered with respect to said base or floor, by a small bolt or set screw 7, threaded laterally through the boss formed on said base 1, to wedge frictionally against the rod 6. The upper end of the rod 6, is cut away on each side, leaving a tongue 8, with rounded shoulders 9, on each side thereof.

The supporting pedal for the device consists of a pivotal curved plate 10, the upper surface of which is grooved or corrugated, or roughened in any suitable manner, to obviate to a large extent, slipping of the shoe thereon. Formed integral with said curved pedal plate on the under surface thereof, are lugs 11, which are apertured to receive a pivot screw or bolt 12, therethrough, and through a pivot aperture provided in the tongue 8, whereby said pedal plate is pivotally supported on the upper end of the vertically adjustable rod 6. The rounded shoulders 9, afford abutments for the lugs 11, of the tilting plate 10, as shown in dotted lines in Fig. 3, to limit the pivotal movement thereof so that the plate cannot swing down into a position difficult for access when the foot is removed therefrom.

In the modified view illustrated in Fig. 2, a slightly different accelerator pedal 13, is illustrated, consisting of a rod movable perpendicularly through the floor and provided with a head on which the sole of the forward portion of the shoe rests.

The operation is as follows: In using the device, the foot of the operator assumes substantially the position illustrated in Figs. 1 and 2, and the lowermost rear portion of the heel of the shoe may or may not contact the floor of the car, dependent upon the particular adjustment of the accelerator pedal 3, for a certain predetermined speed of the car. For instance, if an operator finds it desirable the foot rest may be adjusted to a height such that for normal driving speeds of from fifteen to twenty miles an hour, the foot is supported beneath the arch by the tilting plate 10, and also by the heel bearing upon the floor, with the toe or forward portion of the shoe of course bearing upon the accelerator pedal. However, in practically all cases it will be found most desirable to have the foot rest adjusted such that when the accelerator pedal 3, is in its normal position, or in other words that adjustment for idling speed of the engine, the lower rear part of the heel of the shoe will rest upon the floor of the car with the foot rest beneath the arch, and depressions of the accelerator pedal will be obtained by tilting the foot on the pivoted plate 10, thus elevating the heel from the floor of the car, and yet sustaining practically the entire weight of the foot and thrusts applied through the leg of the operator, upon the foot rest substantially in line with the pivot center of the support, so that an easy muscular action of the foot upon the accelerator pedal is at all times obtained. For different persons, the height of the foot rest may be varied by loosening the small bolt or set screw 7. This feature is particularly desirable in providing a rest for a lady's foot, owing to the general high arch or instep thereof, so that the same, after attachment, may be adjusted to afford an efficient and comfortable foot rest for either person. The device is also readily adaptable for use of persons having different size feet, owing to the fact that in using the accelerator pedal, there is no particular fixed point of contact between the toe or forward portion of the foot and the pedal. This feature also admits of a range of positions of the foot of the operator for contact with the pedal.

Of course, the different features of construction may be varied through a wide range, that is, the shape of the supporting plate 10, and method of connection to the rod 6, as well as the means of adjusting and locking the rod in different positions are all susceptible to change. Then, too, means may be provided for shifting the base member 4, to different points upon the floor of the car by slight modifications in design and means of attachment thereof. However, all these possible changes in construction fall well within the scope of my invention, and I purpose claiming broadly the idea of affording a tilting support for the foot substantially in line with the line of stress or muscular pivotal center of the foot to permit movement thereof to actuate a pedal or other similar means operating as and for the purposes set forth and described in this specification, and I do not purpose limiting the patent granted otherwise than necessitated by the prior art.

I claim as my invention:

1. A pivotal adjustable foot rest for attachment to the floor of a motor car to permit actuation of the accelerator pedal by the toe of the foot comprising an apertured base member attachable on the floor of the car to register with an aperture in the floor, a cylindrical rod adjustable therethrough, means associated with said base to lock the rod in adjusted position, a plate pivoted on the upper end of said rod to receive the instep of the foot resting thereon to sustain the weight of the foot and to resist leg thrusts transmitted thereto, and means formed on said rod for co-action with said foot plate to limit the pivotal movement thereof on said rod.

2. A foot rest of the class described adapted to receive the instep of a foot resting thereon for actuation of a pedal by the toe of the foot comprising a base plate adapted to be mounted rigidly in position, an upright member fitted adjustably therein, a set screw provided through said base member adapted to be threaded inwardly to frictionally bear upon said upright member to hold the same in an adjusted position, a curved pedal plate, a pair of lugs depending from the under surface thereof, the upper end of said upright member reduced in size to fit between said lugs and affording shoulders on each side of said upright member, and a pivot connected between said lugs and the reduced upper end of said upright member permitting pivotal movement of the pedal plate thereon, said lugs coacting with said shoulders to limit the movement of the pedal.

3. A foot rest of the class described comprising a circular apertured base member, a cylindrical upright rod adjustable therethrough, a set screw provided in said base member adapted to be threaded inwardly to bear upon said rod to hold the same in an adjusted position in said base member, the upper end of said rod reduced in size affording a flat upright tongue on the end thereof, a curved pedal plate, lugs formed on the under surface thereof substantially equi-distant from the forward and rear ends of said plate adapted to fit on each side of the flattened tongue on said upright member, and a pivot extending through said lugs and through said tongue whereby said pedal is pivotally mounted on said upright member and is limited in its movement thereon by contact of the lower ends of its lugs with the upright member.

In testimony whereof I have hereunto subscribed my name in the presence of two subscribing witnesses.

OSCAR H. HICKS.

Witnesses:
LE ROY D. KILEY,
EARL M. HARDINE.